United States Patent
Lark

(10) Patent No.: US 7,463,470 B2
(45) Date of Patent: Dec. 9, 2008

(54) ELECTRICAL BARRIER

(75) Inventor: Peter Kingston Lark, Manchester (GB)

(73) Assignee: Pepperl & Fuchs GB Ltd, Oldham (GB)

( * ) Notice: Subject to any disclaimer, the term of this patent is extended or adjusted under 35 U.S.C. 154(b) by 0 days.

(21) Appl. No.: 11/275,661

(22) Filed: Jan. 23, 2006

(65) Prior Publication Data

US 2006/0164780 A1   Jul. 27, 2006

(30) Foreign Application Priority Data

Jan. 24, 2005   (GB)   ................. 0501415.4

(51) Int. Cl.
*H02H 3/22* (2006.01)
*H01C 7/12* (2006.01)
*H02H 1/00* (2006.01)
*H02H 1/04* (2006.01)
*H02H 9/06* (2006.01)

(52) U.S. Cl. .............. 361/111; 361/18; 361/91.2; 361/91.6

(58) Field of Classification Search ............ 361/18, 361/91, 111, 91.2, 91.6
See application file for complete search history.

(56) References Cited

U.S. PATENT DOCUMENTS 4,554,500 A * 11/1985 Sokira .................. 320/139
5,365,420 A * 11/1994 Cadman ................ 363/50

FOREIGN PATENT DOCUMENTS

DE    19846757 C1    6/2000

OTHER PUBLICATIONS

European Patent Office Search Report, Application No. 06250333.9-2207, Jul. 21, 2006.

* cited by examiner

*Primary Examiner*—Michael J Sherry
*Assistant Examiner*—Dharti H Patel
(74) *Attorney, Agent, or Firm*—Barlow, Josephs & Holmes, Ltd.

(57) ABSTRACT

An electrical barrier (10) for connecting a power supply to electrical equipment situated in a potentially explosive atmosphere comprises an input (12), output (13), a shunt Zener diode (14), a fuse (15), an output resistor (16) and the sensor resistor (11). The Zener diode (14) is operable to limit the output voltage of the barrier. In some embodiments multiple Zener diodes are used if desired or appropriate. The output resistor (16) acts to limit the maximum output current whilst the fuse (15) acts to prevent operation of the barrier in the event of an excessive input. The sensing resistor (11), being in series with the Zener diodes (14), allows the current flowing through the Zener diode (14) to be determined. The value of this current is then used to regulate the voltage input to the barrier (10). By using such a sensing resistor in series with the Zener diode (14), the voltage on the Zener diode (14) can be controlled so that the desired current flows. This advantageously requires that no allowance or adjustment for the tolerance of the voltage regulator or the Zener diode is required and furthermore no allowance or adjustment needs to be made to accommodate the temperature coefficient of the Zener diode (14).

4 Claims, 3 Drawing Sheets

ELECTRICAL BARRIER

The present invention relates to an electrical barrier suitable for use between a power supply in a safe area and intrinsically safe circuitry in a hazardous (potentially explosive) atmosphere.

The operation of electrical equipment in potentially explosive atmospheres carries the risk of triggering an explosion. In order to reduce this risk, the concept of intrinsic safety is used. This involves limiting the energy used by any electrical equipment in a potentially explosive atmosphere to a level that cannot cause ignition. Typically this is achieved by connecting an electrical barrier between a power supply and the equipment used in the potentially explosive atmosphere often with the use of additional circuitry e.g. galvanic isolation.

A typical barrier comprises a zener diode (typically a plurality of zener diodes) provided as a shunt so as to limit the maximum voltage that may be supplied to the equipment. A series fuse is provided to prevent overload of the zener diodes. Additionally a series resistance is provided on the output side of the barrier to limit the maximum current supplied to the equipment to the zener diode voltage divided by the series resistance.

This can thus reduce the energy in any equipment in the potentially explosive atmosphere to a safe level as the energy stored in any capacitance in the equipment is limited by the voltage it can be charged to and similarly the energy stored in any inductance is limited by the current.

The presence of the shunt zener diodes, the series fuse and the series resistance limits the levels that can be input to the equipment via the barrier. Users may wish to get a larger voltage at light load from the barrier in some applications and a larger current at lower load resistances in other applications. It is therefore desirable to be able to operate the barrier with as high a voltage as possible on the zener diodes and as high a current as possible through the fuse. If however the voltage on the zener diodes is too high, the resulting shunt current would not be available to the load and if high enough would blow the fuse. This problem can be minimised by specifying a maximum input voltage or by incorporating protection circuitry that either limits the current that can flow into the fuse or limits the voltage on the zener diodes.

The drawback with current limitation is that the current limit must be at least the greatest load current required however, when a lesser load current is required, additional current flows in the zener diodes, if the input voltage is high enough. This is a waste of power and is exacerbated when the barrier output is an open circuit and thus the maximum current limit flows through the zener diodes.

The problem with voltage regulation is that the voltage limit must be set low enough that the zener diodes do not conduct too much at all operating temperatures (zener diodes have a significant temperature coefficient) and with worst case component tolerances. This reduces the signal level that can safely be used. Additionally, this regulation is carried out most efficiently in a switch mode circuit and most conveniently by sensing the voltage on the supply side of the fuse however this requires the voltage across the fuse resistance to be added to the margin between the regulated voltage and the zener voltage.

It is therefore an object of the present invention to provide a new and improved electrical barrier for use between a power supply and electrical equipment used in a potentially explosive area.

According to the present invention there is provided an electrical barrier comprising: an input adapted to be connected to a power supply and an output adapted to be connected to electrical equipment for use in a hazardous area; at least one shunt zener diode for limiting the output voltage, and an output series resistance for limiting the output current wherein a sensing resistance is provided in series with the zener diode or diodes and wherein means are provided for regulating the input voltage in response to current flowing through the sensing resistance.

This arrangement provides an electrical barrier suitable for use between a power supply and electrical equipment in a potentially explosive atmosphere. Additionally, control of the voltage applied to the zener diodes allows them to be operated with a desired maximum current flowing. This arrangement also requires no allowance or adjustment for the tolerance of a voltage regulator or the zener diodes nor does it require any allowance or adjustment for the temperature coefficient of the zener diodes.

Preferably, information relating to the current flowing in the sensing resistance is fed to a voltage regulator provided on the supply side of the barrier allowing the voltage applied to the zener diodes or diodes to be regulated. Most preferably, a voltage to current comparator is provided in parallel with the sensing resistance, the output of the voltage to current comparator being fed to the voltage regulator In order to prevent current flow in parallel to the safety fuse, one or more diodes may be provided between the voltage to current converter and the voltage regulator.

This arrangement may be further adapted to limit the current at the output terminals. This may be achieved by providing a first output series resistor and a second output series resistor in series with each other and a comparator resistor to the junction of the output series resistors.

If desired the barrier may additionally comprise an isolating transformer provided between the power supply and the zener diode or diodes. This thus provides an isolated barrier.

In such embodiments, a switch mode circuit may be provided before the primary coil of the isolating transformer to regulate the input Additionally a switch mode circuit may be provided after the secondary coil of the isolating transformer to regulate the voltage applied to the zener diode or diodes or to regulate the load current. Preferably, the switch mode circuit comprises a switch mode regulator, a pair of switch mode capacitors provided either side of the switch mode regulator and a speed up transistor provided on the output side of the capacitors and switch mode regulator, a first speed up resistor being connected between the source and the gate of the transistor and a second speed up resistor. This provides a switch mode circuit with a fast response time as when the input is switched off, the output responds by switching off as soon as no current flows through the second speed up resistor and is thus not delayed by the discharge of the capacitors. In pulsed applications this applies to the switch on time also as the capacitors will have only partially discharged during a short off period and hence the inrush current will be minimised when the input is switched on. The transistor may be a MOSFET but may in alternative embodiments comprise any other suitable form of transistor.

The switch mode circuit may be provided with a diode arrangement adapted to accommodate a change in input polarity or an AC input. In the present invention, one such switch mode circuit may be provided between the power supply and the primary coil of an isolating transformer, the power supply connected to the input and the primary coil connected to the output; and a second such switch mode circuit may be provided between the secondary coil of an isolating transformer and the input to a barrier as described above the input of the switch mode circuit being connected to the secondary coil and the output being connected to the barrier input.

In order that the invention is more clearly understood, it will now be described in greater detail below, by way of example only, with reference to the drawings, in which.

Figure 1:
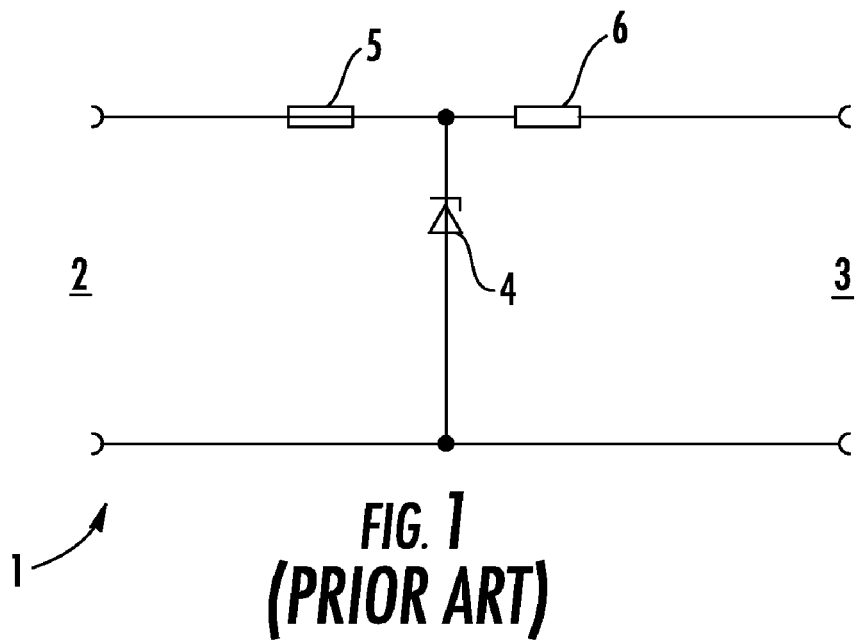
FIG. 1 is a schematic diagram of a known electrical barrier.

Referring now to FIG. 1, a known electrical barrier 1 for connecting a power supply to electrical equipment in a potentially explosive atmosphere comprises an input 2 and an output 3. In between said input and said output are provided a shunt zener diode 4, a fuse 5 and an output resistor 6. The zener diode 4 is operable to limit the output voltage of the barrier and may in some embodiments comprise a plurality of zener diodes, if desired or appropriate. The output resistor 6 is operable to limit the maximum output current whilst the fuse 5 is operable to prevent operation of the barrier if an excessive load is input.

Figure 2:
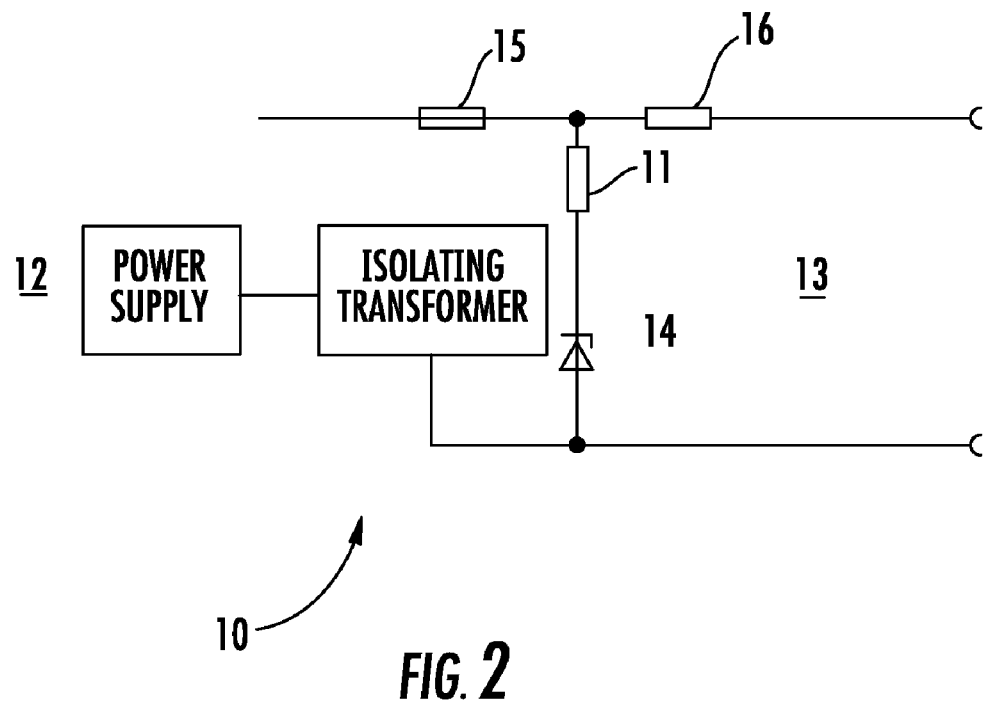
FIG. 2 is a schematic diagram of an electrical barrier according to the present invention.

Referring now to FIG. 2, an electrical barrier 10 according to the present invention comprises an input 12, output 13 a shunt zener diode 14, a fuse 15, an output resistor 16 and a sensing resistor 11. As in the known embodiment, the zener diode 14 is operable to limit the output voltage of the barrier and may in some embodiments comprise a plurality of zener diodes, if desired or appropriate. The output resistor 16 is operable to limit the maximum output current whilst the fuse 15 is operable to prevent operation of the barrier in the event of an excessive input.

The sensing resistor 11, being in series with the zener diode 14 allows the current flowing through the zener diode 14 to be determined. The value of the current can then be used to regulate the voltage input to the barrier 10. By using such a sensing resistor resistance in series with the zener diode 14 in this manner, the voltage on the zener diode 14 can be controlled so that a desired current flows. This method advantageously requires no allowance or adjustment for the tolerance of the voltage regulator or the zener diode and no allowance or adjustment due to the temperature coefficient of the zener diode 14.

Figure 3:
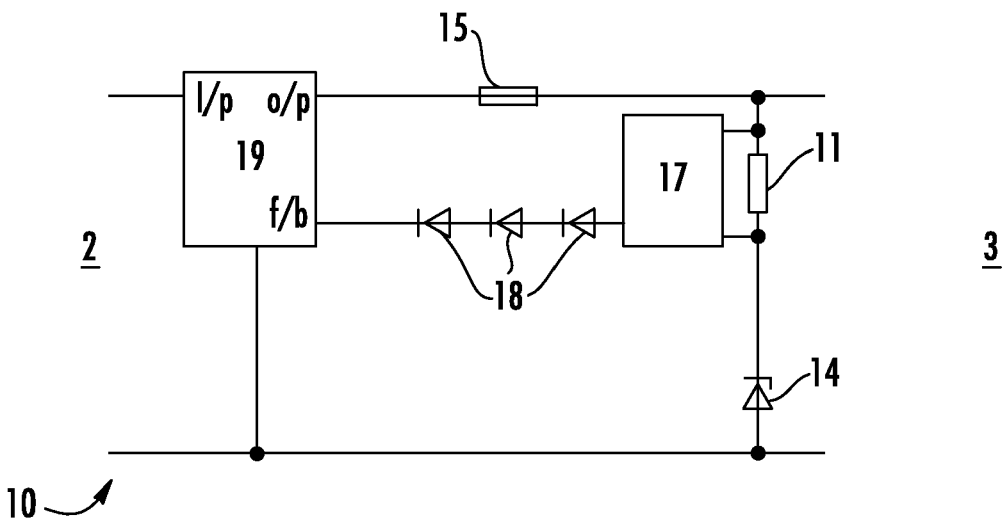
FIG. 3 is a schematic diagram of an arrangement for regulating the voltage applied to zener diodes in an electrical barrier according to the present invention.

This regulation is achieved by the arrangement shown in FIG. 3. A voltage to current converter 17 is provided in parallel with the sensing resistor 11 the output of this voltage to current converter is then fed to the feedback input of a voltage regulator 19, the voltage regulator connected to the input 12.

The connection between the voltage to current converter 17 and voltage regulator 19 would normally be a problem as it provides a potential path parallel to the fuse 15 and would thus need to be current limited to protect the zener diode 14 from overload. This extra current would also mean that the zener diode 14 requires a higher minimum power rating. One possible alternative, isolating the signal path, would be impractical because operating current would have to be taken from the zener side of the fuse 15 reducing that available to the load. Accordingly in the present invention a combination of three diodes 18 in series is used to allow the feedback of a small current (proportional to the zener current) to the voltage regulator 19. For safety certification three diodes 18 are provided to prevent any reverse current flow. Any forward current in the diodes 18 would come from the fuse current, and not in to the zener diode 14 so that it would not need to be certified with a higher minimum power rating.

Of course it is clear that if the fuse 15 were to be positioned on the negative side, the polarity of the diodes 18 would be reversed. Additionally, it is clear that the sensing resistor 11 does not necessarily have to be on the positive side of the zener diode 14.

Figure 4:
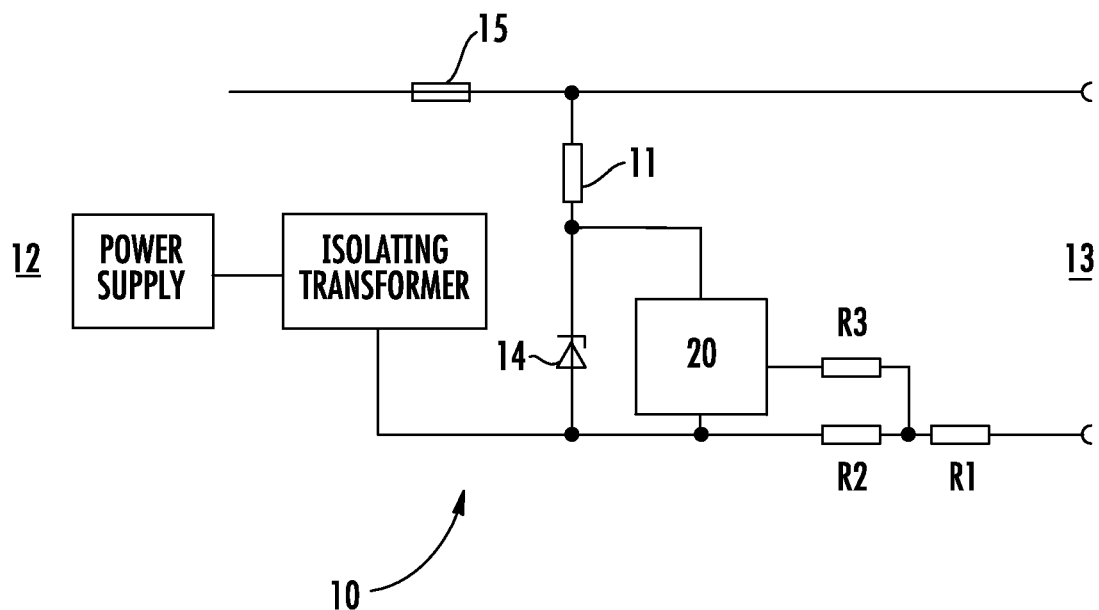
FIG. 4 is a schematic diagram of an arrangement for regulating the current output of an electrical barrier according to the present invention.

It is also possible with the barrier 10 of the present invention to regulate the output current. By providing an arrangement of the type shown in FIG. 4, the current at the output terminals can be directly controlled. In the arrangement of FIG. 4 the output resistor 16 is replaced by an arrangement of three resistors R1, R2, R3 and a voltage to current comparator 20. In operation, current output drawn by the load causes a voltage drop in the output resistors R1 and R2. The value of R2 is chosen so that the voltage at current limit is the threshold voltage of the voltage to current comparator 20. As the load current approaches the current limit, the voltage to current comparator 20 starts to shunt current in parallel with the zener diode 14. This causes the voltage regulator 19 to reduce its output voltage in the same way as if the zener diode 14 was starting to conduct This limits the voltage available to the output resistors R1, R2 and hence limits the output current to the load. R3 is a high value resistor that has to be considered in parallel with R2 for calculation of the safety parameters of the barrier. The voltage to current comparator 20 can only shunt fuse current in parallel with the zener 14 and away from the load.

Figure 5A:
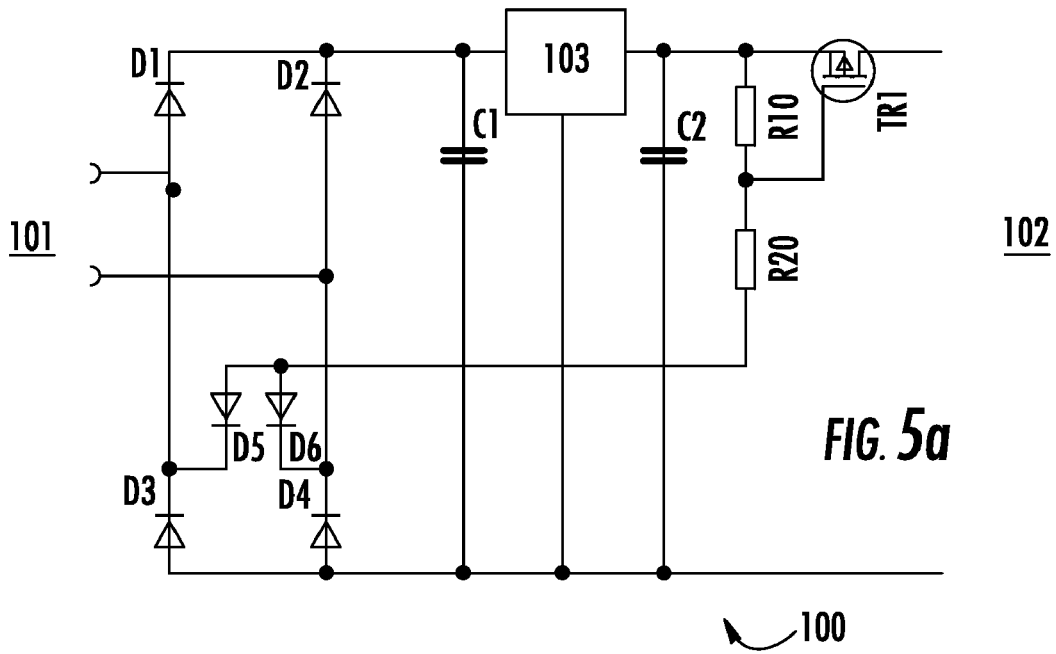
FIG. 5a is a first view of a switch mode circuit suitable for use with an electrical barrier according to the present invention.
Figure 5B:
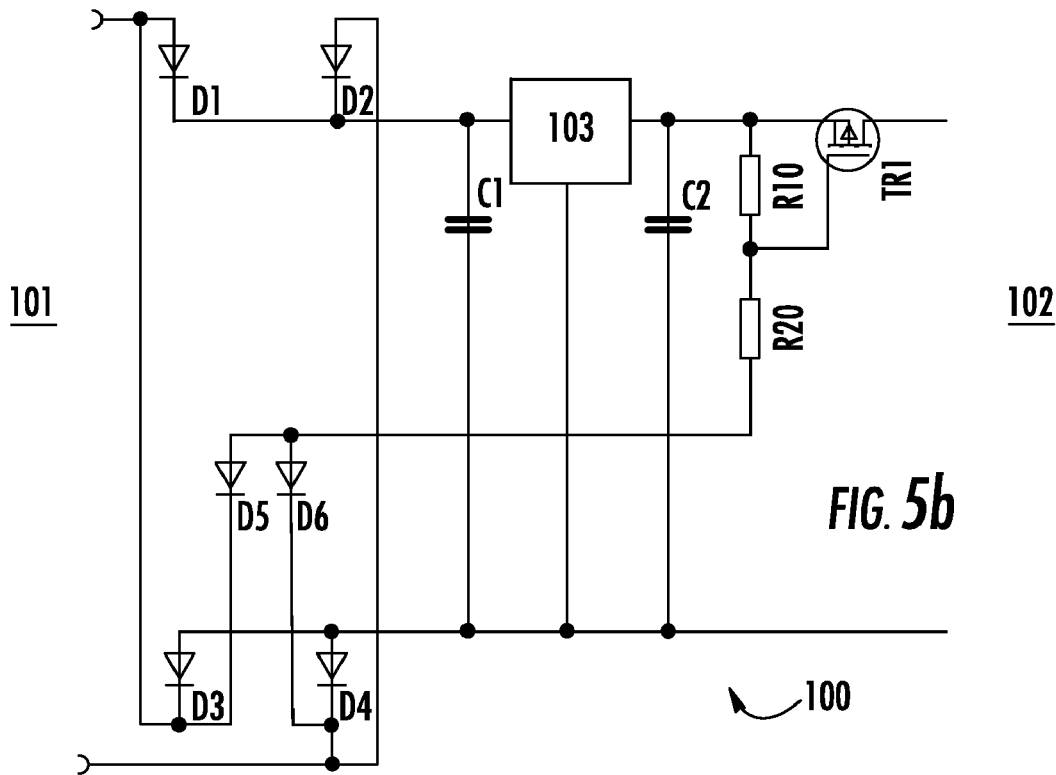
FIG. 5b is a second view of a switch mode circuit suitable for use with an electrical barrier according to the present invention.

In some embodiments, the barrier 10 may use a switch mode circuit 100 to regulate the voltage. In further embodiments, the barrier 10 may be isolated by providing a transformer between the power supply and the barrier input 12. In such embodiments, a switch mode circuit 100 may be provided between the power supply and the primary coil of the transformer for line regulation and also between the secondary coil of the transformer and the barrier input 12. The use of switch mode circuits 100 for line regulation reduces the power dissipation when compared with linear regulation but increases the response time due to the relatively large capacitances used. FIGS. 5a and 5b however illustrate a switch mode circuit 100 with a faster response time than conventional switch mode circuits.

The switch mode circuit of FIGS. 5a and 5b comprises an input 101, an output 102, diodes D1-D6, a pair of capacitors C1, C2 disposed either side of a switch mode regulator 103, a speed up transistor TR1 having a first speed up resistor R10 connected across its gate and source, and a second speed up resistor R20. Power is supplied to the output 102 when TR1 is switched on. In order for TR1 to be switched on a current must flow through R20 to produce a voltage on R10. In the absence of input current, as D5 and D6 are of reverse polarities to D3 and D4, no current can flow through R20 and there is no voltage across R10. TR1 thus switches off and no power is supplied to the output 102. The switch off is quick because there is no delay whilst the smoothing capacitors C1 and C2 discharge.

The diodes D1-D6 allow the switch mode circuit 100 to accommodate a change of polarity or an alternating input. For instance current flowing from input 101 to R10 can flow through either D1 and D6 or D2 and D5 depending on the polarity of the input. This may be seen more clearly in FIG. 5b wherein the portion of the diagram relating to the diodes has been redrawn for this purpose.

In some circumstances a pulsed input 101 will be used in pulsed applications, it is advantageous that C1 and C2 are disconnected from the output 102 to minimise their discharge during an off period. This is because when the off period ends, if the capacitors are only partially discharged, the inrush current to the capacitors is minimised and hence the delay in supplying power to the output 102 is minimised.

It is of course clear that alternatively, TR1 and R10 could be connected to the negative rail and the polarity of D5 and D6 reversed, if desired Similarly whilst TR1 is conveniently a MOSFET any other suitable form of transistor may be substituted if desired It is of course to be understood that the invention is not to be limited to the details of the above embodiments which are described by way of example only.

Whilst a sensing resistor 11 is described in the specification, it is, of course, to be understood that a plurality of sensing resistors in parallel can be used, as an alternative or as necessary The voltage to current comparator can, in one embodiment, be formed by an amplifier.

The invention claimed is:

1. An electrical barrier consisting of:
   an input adaptor to be connected to a power supply and an output adaptor to be connected to electrical equipment for use in a hazardous area;
   a single shunt zener diode polarized in the reverse for limiting the output voltage;
   an output series resistance for limiting the output current wherein a sensing resistance is connected in series with the a single shunt zener diode; and
   a voltage regulator configured and arranged to regulate an input voltage in response to current flowing through the sensing resistance.

2. An electrical barrier according to claim 1, wherein information relating to the current flowing in the sensing resistance is fed to the voltage regulator provided on the supply side of the barrier allowing the voltage applied to the single shunt zener diode to be regulated.

3. An electrical barrier consisting of:
   an input adaptor to be connected to a power supply and an output adaptor to be connected to electrical equipment for use in a hazardous area;
   a single shunt zener diode for limiting the output voltage;
   an output series resistance for limiting the output current;
   a sensing resistance connected in series with said zener diode, wherein said sensing resistance and said zener diode act in combination to limit the output voltage;
   a voltage regulator configured and arranged to regulate an input voltage in response to current flowing through the sensing resistance.

4. An electrical barrier consisting of:
   an input adaptor to be connected to a power supply and an output adaptor to be connected to electrical equipment for use in a hazardous area;
   a single shunt zener diode polarized in reverse for limiting the output voltage, the power supply delivering a current, all of the current being routed through the zener diode polarized in reverse;
   a sensing resistor connected in series with said zener diode, wherein said sensing resistor and said zener diode act in combination to limit the output voltage;
   an output series resistor for limiting the output current, said output sensing resistor being connected in series with the load; and
   a voltage regulator configured and arranged to regulate an input voltage in response to current flowing through the sensing resistor.

* * * * *